A. GATES.
Bale-Tie.

No. 215,909.                Patented May 27, 1879.

Attest:
William F. Selkirk
W. K. Stevens.

Inventor.
Adelbert Gates
by his Attorney
Alex. Selkirk

UNITED STATES PATENT OFFICE.

ADELBERT GATES, DECEASED, (ANNA B. GATES AND LINUS B. GATES, ADMINISTRATORS,) OF SCHENECTADY, NEW YORK, ASSIGNOR, BY MESNE ASSIGNMENTS, TO WASHBURN & MOEN MANUFACTURING COMPANY, OF WORCESTER, MASSACHUSETTS.

IMPROVEMENT IN BALE-TIES.

Specification forming part of Letters Patent No. 215,909, dated May 27, 1879; application filed January 31, 1877.

*To all whom it may concern:*

Be it known that I, ADELBERT GATES, of the city and county of Schenectady, and State of New York, have invented a new and useful Improvement in Wire Bale-Ties, which improvements are fully described in the following specification and accompanying drawings, in which—

Figure 1:
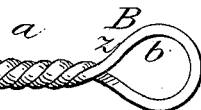
Figure 2:
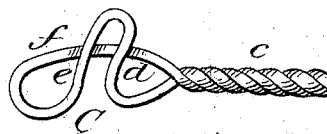

Figure 1 represents a perspective view of the loop end of the bale-band. Fig. 2 is a perspective view of the hook end of the same, and Fig. 3 is a plan view of the loop and hook ends when connected.

The object of my invention is to furnish a single-strand hook with a brace, also of a single strand, and a supporting-rim made continuous with the brace, by which brace and supporting-rim the hook will be prevented from being drawn forward by the force of the strain exerted, as also from being drawn downward, and thereby prevent the hook from slipping the opposite end loop, while at the same time the connection of the ends of the tie may be made without requiring a slackness in the band.

In the drawings, A represents the strand of wire from which the bale-band and its parts are made. B is the loop end, composed of loop $b$ and the twisted neck $a$, formed in the manner usually practiced by the trade, and C is the hook end, supported from the strand A by twisted neck $c$.

Figure 3:
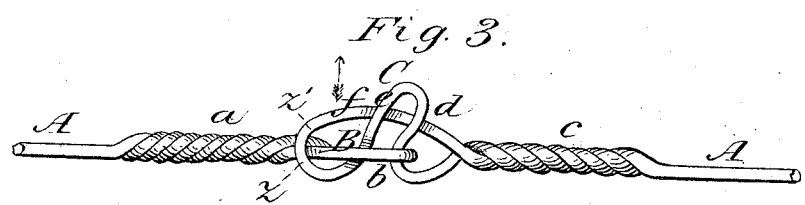

The hook end C is composed of the single-strand hook $d$, base $e$, and supporting-rim $f$, made in a continuous manner from one of the ends of strand A, with the hook $d$ and its brace $e$ standing on an angle in relation to the supporting-rim $f$, and in such a manner that the end of the hook, where it terminates with the brace, will be made to project past a vertical line with said supporting-rim, and at the same time produce a passage-way between said supporting-rim and the hook and its brace for the passage of the loop $b$ upward, when it is desired to make a connection of the two ends of the tie, as shown in Fig. 3.

When it is desired to connect the two ends of the tie, the loop $b$ is to be passed upward in an oblique manner, through the passage-way between the supporting-rim $f$ and hook $d$ and its connected brace $e$, until the upper side of said loop has been carried up past the upper end of the hook. The loop $b$ is then to be turned over the point of the hook and its brace.

When the compressed bale has been released from the pressure of the press, and the elastic force of the bale is exerted on the tie, the loop $b$ will be drawn downward on hook $d$, and cause said hook to lie down on the supporting-rim $f$, while the brace $e$ will prevent the hook being drawn forward.

When the strain has been exerted on both ends of the tie to such an extent as to draw both the hook and its brace down on the supporting-rim $f$, the loop $b$ will be made to bite on the bow $z$, connecting the supporting-rim with the brace, and thereby relieve both the hook and its brace of a large degree of strain that would otherwise be exerted on the hook and brace if they alone resisted the strain.

The great advantages attending the improvements in this invention are these: The loop end may be made to readily connect with the hook end of the tie without requiring any slackness of the band. The hook is not only effectually braced against being drawn forward and downward, but it is also relieved of a considerable degree of strain by the bow of the opposite end loop drawing against the bow of the brace and supporting-rim.

Another advantage is, that all necessity for cutting the band, when it is desired to remove it from the bale, is wholly removed, as the hook $d$ and its brace $e$ may be made to slip the loop $b$ when it is desired by the operator simply inserting the point of a hay-hook or bill-hook between the supporting-rim and loop $b$, and drawing the said supporting-rim outward in direction of arrow in Fig. 3, so that the hook $d$ may draw down, when the said hook will slip the loop off and the two ends will disconnect.

Having described my invention, what I claim, and desire to secure by Letters Patent, is—

A bale-tie wire having loop at one end, and at the other end a larger loop, one side of which is bent upward to form the inclined hook, substantially as shown and described.

ADELBERT GATES.

Witnesses:
J. H. VAN AUKEN,
E. B. SWART.